3,212,955
TIRE CORD BONDING WITH POLYMETHYLOL-MELAMINE RESINS
Samuel Kaizerman, Plainfield, N.J., assignor to American Cyanamid Company, Stamford, Conn., a corporation of Maine
No Drawing. Filed May 10, 1962, Ser. No. 193,860
12 Claims. (Cl. 161—88)

This invention relates to the manufacture of cord-reinforced, sulfur-vulcanized rubber goods. More particularly, it is concerned with improving the cord to rubber bond. As such, it contemplates an improved adhesive composition for bonding reinforcing cords to rubber, to reinforcing cords treated with the adhesive composition and to a rubber article having a cord bonded therein by means of the adhesive.

In making cord-reinforced vulcanized rubber products, for example, vehicle tires, strength under tension is a critical factor. In many cases it is found that the bond between the cord and the rubber is the point at which failure occurs. In the past, a number of proposals have been made to improve the bond. Some have been widely used. For example, when cotton cords are satisfactory, natural rubber latex may be used quite successfully as the bonding adhesive.

Cotton itself, however, is not as strong as is often desired for many reinforcing uses. With the development of stronger synthetic fiber cords, their advantage in reinforcing tires and the like led to their being tried for this purpose. Unfortunately, when attempts were made to substitute synthetic fiber cords, such as rayons, nylons, orlons and the like, it was found that very poor adhesion is obtained with natural and synthetic rubbers unless the cord is pretreated with special adhesive compositions.

Various compounding agents, such as casein and resins, like phenol-formaldehyde and resorcinol-formaldehyde reaction products, have been added to the natural rubber latex. Other resinous adhesives, such as heat-setting melamine-formaldehyde condensation products, have been suggested. It was found also that further improvement can be obtained if the resinous material is combined with a rubber latex in preparing the bonding agent.

Nevertheless, with all the improvements thus obtainable, for many purposes the cord-to-rubber bond still is not wholly satisfactory. If a method were available which could further improve this bond, it would be highly useful. Particularly is this true in the manufacture of rubber tires where both the strength of the cord and the bonding of the cord to the rubber are critical for the safety of the passengers.

It is, therefore, a principal object of the present invention to supply this demand for improved bonding compositions and for methods of making and using them. Since tire manufacture illustrates the typical problems, it will be used as illustrative for purposes of this discussion.

In accordance with the present invention, this object has been accomplished to a surprisingly successful degree by using a novel cord-treating composition comprising (a) an etherified polymethylolmelamine and (b) a suitable rubber latex. Improved results can be obtained using latices of a wide variety of commercially-available rubbers, including natural rubbers; various known synthetic rubbers, such as the rubber-like butadiene-acrylonitrile copolymers; copolymers of isobutylene and an olefin; and the like. However, the preferred embodiment of the present invention is in the use of latices of synthetic rubber-like copolymers of butadiene and styrene. In particular, the industrial type commonly known as SBR is preferred.

The improved adhesives of the present invention may be used for bonding reinforcing cords or fabrics to natural rubber, synthetic rubber, reclaimed rubber and blends of the same. Obtaining such a result is particularly surprising in view of the fact that somewhat similiar combinations of a rubber latex and a heat-setting melamine resin have been previously proposed and found to be inadequate.

In major part, success in the present invention is due to the use of a wholly different type of melamine resin. In general, they may be designated as etherified methylolmelamines. These are not new materials per se and they are prepared by known methods. For example, some two to six moles of formaldehyde may be reacted with one mole of melamine to form a condensation product. This product is then reacted with some two to six moles of a lower alcohol, whereby an etherified polymethylolmelamine is formed.

In the present invention, the resin is preferably employed as an aqueous solution. Products which are too highly polymerized tend to be difficulty soluble in water. Accordingly, excessive polymerization should be avoided.

Such etherified polymethylolmelamines and their manufacture have been described in many U.S. patents including U.S. Patents Nos. 2,329,622 and 2,339,203. They have developed extensive use in the textile resin field. Among the available etherified polymethylolmelamines which are suitable for use are the dimethyl and trimethyl ethers of trimethylolmelamine; the dimethyl and trimethyl ethers of pentamethylolmelamine; the hexamethyl ether of hexamethylolmelamine, and the like.

As to the rubber latex to be used in the adhesive formulation, it may be quite widely varied. In general, as noted above, it may be a latex of either natural or synthetic rubbers. However, in the present invention, as also noted above, use of a butadiene-styrene (SBR) latex constitutes the preferred embodiment, particularly in making tires using various synthetic rubbers. Such latices are well known per se, e.g., Whitby, Synthetic Rubber, John Wiley (1954).

In general, SBR rubbers and 1,3-butadiene-styrene copolymers are made in a wide variety of proportions, a number being designed for special usages. They may contain from as little as about five to as much as about fifty percent of bound styrene. However, for the purposes of the present invention the bound styrene content should range from about fifteen to about forty-five percent, usually from about twenty to about twenty-five. Industrially-available products often, but not necessarily, contain some one to three percent of an antioxidant, usually of the staining-type. Herein, the term "rubber solids" includes the antioxidant if one is present.

Whether purchased as such or made-up for present purposes, the rubber solids content of the latex may be widely varied. SBR latices are commercially available containing up to about sixty percent rubber solids. For the purposes of the present invention preferred latices should contain from about twenty to about forty percent rubber solids.

In general, the proportions of latex to resin may be varied quite widely. Improved bonding is obtainable using adhesive compositions in which the rubber:resin weight ratio varies from about 1:2 to about 25:1. However, in most cases, these limits may be narrowed to from about 1:1 to about 10:1.

Combining of the resin and latex into the adhesive composition of this invention is readily carried out. The rubber content of the available latex is known, as is the concentration of the resin in its solution. Sufficient water is added to a volume of the latex to provide the desired final water content and the resin solution is stirred in. Agitation during mixing should be sufficiently thorough to insure substantially uniform conditions in the finished composition. A terminal rubber solids content of some 5–25 weight percent of composition is found to comprise a good practice.

In general, the etherified polymethylolmelamine to be used should be placed in aqueous solution before being combined with the latex. Since these resins are quite water-soluble, no special aids or precautions are necessary. However, the dissolved solids content is preferably below about 50%.

It is an advantage of this invention that no special limitations are imposed on the reinforcing cords. Cords and fabrics which may be bonded to rubber in accordance with the present invention may be of any of the various types and sizes of cord or fabric currently in use for this purpose. The invention is particularly suited to the bonding of viscose rayon cords and fabrics, but is not limited to this material, being also useful for cotton, nylon and the like.

As to the amount of adhesive which should be employed, the optimum will depend on the intended vulcanized product. It is most easily defined as weight percent of the weight of the cord. In general, it may vary from as little as one percent to as high as about twenty. A good practice in most cases will be found in the use of from about three to about fifteen percent.

Another advantage of the invention is in the fact that no special precautions or unusual apparatus is required. The adhesive, in the form of an aqueous solution or emulsion is applied to the cord or fabric by dipping or by any other convenient conventional method for saturating the cord. Excess liquid then is removed in conventional manner by pressure rolls or their equivalent. Thereafter, treated cord or fabric is dried, at a temperature between 100° and 200° C., usually at from about one-half to about thirty minutes. Cords and fabrics thus treated with the adhesive are then bonded to the rubber base stock by vulcanization.

The invention will be more fully described in conjunction with the following illustrative examples. Therein, unless otherwise noted, all parts and percentages are by weight and temperatures are indicated in degrees centigrade.

In the following Examples 1–3, tire carcass stock of natural rubber is used for testing purposes. This stock has the following composition.

| Component: | Parts (by weight) |
|---|---|
| Smoked sheets | 100.0 |
| Zinc oxide | 51.5 |
| Pine tar | 1.5 |
| Polymerized trimethyldihydroquinoline | 1.5 |
| Stearic acid | 1.5 |
| Sulfur | 3.0 |
| 2-benzothiazolyl disulfide (MBTS) | 0.8 |

A test latex also is used. It is a commercially-purchased latex of SBR rubber, having a butadiene/styrene weight ratio of about 75/25. It has the following composition:

| | Percent |
|---|---|
| Rubber solids [1] | 60 |
| Water | 40 |

[1] Includes staining-type antioxidant.

Strength of the rubber-to-cord bond is evaluated by measuring the average force required to pull a specified number of cords from the rubber substrate. In the examples, an Instron Model TM tensile-strength tester was used, the cross-head speed being two inches per minute and the cords and rubber base stock are pulled in the same plane.

*Example 1*

To 33.3 parts of the test latex is added 46.7 parts of water and 20 parts of a 20% aqueous solution of the trimethyl ether of trimethylolmelamine. Viscose rayon tire cord of approximately 3300 denier is saturated with the above composition by dipping, followed by passage through squeeze rolls to expel the excess solution to a residual adhesive solids content of about 14%. Resulting wetted cord is air dried in an extended condition, then heated in a circulating-air oven for 0.5 min. at about 110° C. and finally for about one minute at 150° C. So-treated cord is laid in parallel rows, being spaced about 1/8" to 1/4" apart, across the surface of a sheet of tire carcass stock is a preheated 6" x 6" x 0.075" mold. The rubber tire stock is then vulcanized under pressure for 30 minutes at 144.5° C. The average force required to separate two cords from the vulcanized rubber is 6.6 pounds.

*Example 2*

For comparison, the procedure of Example 1 is repeated substituting an equal weight of trimethylolmelamine for the trimethyl ether of trimethylolmelamine. The average force required to separate two cords from the rubber substrate is only 3.6 pounds.

*Example 3*

For comparison, untreated rayon cord is bonded to the rubber carcass stock by the procedure of Example 1. The average force required to separate two cords from the rubber substrate was 0.8 pound.

In the following examples a different rubber tire carcass test stock is used. It contains natural rubber, butadiene-styrene rubber (SBR) and reclaimed rubber ("whole tire reclaim"). This stock has the following composition.

| Component: | Parts (by weight) |
|---|---|
| Natural rubber | 40 |
| SBR 1006 [1] | 40 |
| Whole tire reclaim | 40 |
| Light process oil | 6 |
| Stearic acid | 1 |
| Zinc oxide | 3 |
| 2,2'-methylenebis(4-methyl-6-tert. butylphenol) | 1 |
| FEF [2] carbon black | 35 |
| Sulfur | 2 |
| Accelerator [3] | 1.4 |

[1] Contains 23.5% of bound styrene and a small amount of antioxidant.
[2] Fast extruding furnace.
[3] N-oxydiethylenebenzothiazole-2-sulfenamide (90%) plus a small amount (10%) of 2-mercaptobenzothiazole.

*Example 4*

Using the above-identified test stock, the procedure of Example 1 is repeated with these exceptions:

(1) The wetted tire cord has a residual adhesive solids of 7%;
(2) The wetted cord is dried at ambient temperature for 30 minutes, then at 107° C. for 0.5 minute, and finally at 150° C. for one minute;
(3) The stock is vulcanized for 35 minutes at 144.5° C.

The average force required to strip two cords is 3.03 pounds.

*Example 5*

For comparison, untreated rayon cord is bonded to the rubber carcass stock by the procedure of Example 4. The average force required to strip two cords is only 0.65 pound.

*Example 6*

The procedure of Example 4 is repeated with the exceptions that an equal weight of the hexamethyl ether of hexamethylolmelamine is substituted for the trimethyl ether of trimethylolmelamine; and the residual rubber solids content of the wetted tire cord is only 5.5%. The average force required to strip eight cords is 8.6 pounds.

*Example 7*

For comparison, untreated high tenacity viscose rayon tire cord is bonded to the rubber carcass by the procedure of Example 6. The average force required to strip eight cords is 2.3 pounds.

I claim:
1. In a composite structure comprising at least one textile fiber material surface; at least one vulcanized rubber surface; and an interposed layer unitarily bonded to said textile material surface and to said vulcanized rubber surface; the improvement which comprises utilizing as said interposed layer a heat-cured composition consisting essentially of vulcanizable SBR rubber and a heat-curable etherified polymethylolmelamine resin of the formula

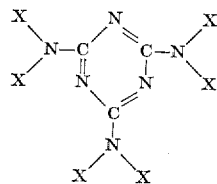

in which each (X) is selected from the group consisting of hydrogen, hydroxymethyl and methoxymethyl, at least two (X's) being methoxymethyl, the weight ratio of rubber solids to resin being in the range of from about 1:2 to about 25:1.

2. A composite structure according to claim 1 in which the resin is the trimethyl ether of trimethylolmelamine.

3. A composite structure according to claim 1 in which the resin is the hexamethyl ether of hexamethylolmelamine.

4. An aqueous adhesive suspension consisting essentially of a latex of unvulcanized vulcanizable SBR rubber and an aqueous dispersion of an uncured, heat-curable etherified polymethylolmelamine resin of the formula

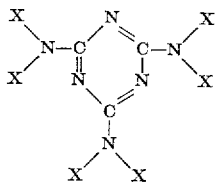

in which each (X) is selected from the group consisting of hydrogen, hydroxymethyl and methoxymethyl, at least two (X's) being methoxymethyl, said rubber solids comprising from about five to about twenty-five weight percent of the composition and said rubber solids and said resin being present in a weight ratio in the range of from about 1:2 to about 25:1.

5. An adhesive suspension according to claim 4 in which the resin is the trimethyl ether of trimethylolmelamine.

6. An adhesive suspension according to claim 4 in which the resin is the hexamethyl ether of hexamethylolmelamine.

7. A rubber reinforcing material comprising essentially a textile fabric material carrying from about three to about fifteen weight percent of residual solids retained from a dried adhesive composition, said composition consisting essentially of a latex of unvulcanized vulcanizable SBR rubber and an aqueous dispersion of an uncured, heat-curable etherified polymethylolmelamine resin of the formula

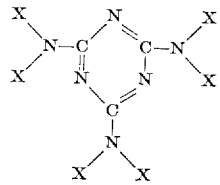

in which each (X) is selected from the group consisting of hydrogen, hydroxymethyl and methoxymethyl, at least two (X's) being methoxymethyl, said rubber solids comprising from about five to about twenty-five weight percent of the composition and said rubber solids and said resin being present in a weight ratio in the range of from about 1:2 to about 25:1.

8. A reinforcing material according to claim 7 in which the resin is the trimethyl ether of trimethylolmelamine.

9. A reinforcing material according to claim 7 in which the resin is the hexamethyl ether of hexamethylolmelamine.

10. A method of improving the bond between vulcanized rubber and reinforcing textile material which comprises depositing on said reinforcing material from about three to about fifteen weight percent of said material of solids from an adhesive composition consisting essentially of a latex of unvulcanized vulcanizable SBR rubber and an aqueous dispersion of an uncured, heat-curable etherified polymethylolmelamine resin of the formula

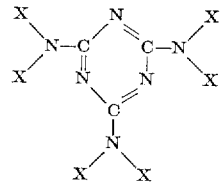

in which each (X) is selected from the group consisting of hydrogen, hydroxymethyl and methoxymethyl, at least two (X's) being methoxymethyl, said rubber solids comprising from about five to about twenty-five weight percent of the composition and said rubber solids and said resin being present in a weight ratio in the range of from about 1:2 to about 25:1; compositing so-treated textile material and unvulcanized rubber into the desired physical form and vulcanizing the rubber in said composite.

11. A method according to claim 10 in which the resin is the trimethyl ether of trimethylolmelamine.

12. A method according to claim 10 in which the resin is the hexamethyl ether of hexamethylolmelamine.

References Cited by the Examiner
UNITED STATES PATENTS

| Re. 22,566 | 11/44 | Johnstone | 117—141 |
| Re. 23,451 | 1/52 | Mighton | 161—243 X |
| 2,211,951 | 8/40 | Hershberger | 156—110 |
| 2,211,959 | 8/40 | Maney | 156—110 |
| 2,339,203 | 1/44 | Stiegler | 117—139.4 |
| 2,442,083 | 5/48 | Hall et al. | 161—243 |
| 2,665,733 | 1/54 | Buckwalter | 156—110 |
| 2,822,026 | 2/58 | Willis | 260—45.2 |
| 2,948,320 | 8/60 | Ford | 156—334 |
| 3,097,111 | 7/63 | Danielson | 156—110 |

EARL M. BERGERT, *Primary Examiner.*